United States Patent [19]

Block et al.

[11] Patent Number: 5,069,522
[45] Date of Patent: Dec. 3, 1991

[54] OPTICAL FIBER LINK CARD

[75] Inventors: Timothy R. Block; Marcia B. Ebler; Ladd W. Freitag; Gerald M. Heiling; Spencer C. Holter; Dennis L. Karst; David W. Siljenberg; Ronald L. Soderstrom; John T. Trnka, all of Rochester, Minn.

[73] Assignee: International Business Machines Corporation, Armonk, N.Y.

[21] Appl. No.: 672,193

[22] Filed: Mar. 19, 1991

Related U.S. Application Data

[62] Division of Ser. No. 462,681, Jan. 9, 1990, Pat. No. 5,039,194.

[51] Int. Cl.$^5$ .............................................. G02B 6/36
[52] U.S. Cl. ...................................... 385/39; 359/113
[58] Field of Search ............... 350/96.10, 96.15, 96.20, 350/96.21

[56] References Cited

U.S. PATENT DOCUMENTS

| | | | |
|---|---|---|---|
| 4,144,550 | 3/1979 | Donohue | 364/518 |
| 4,183,089 | 1/1980 | Daughton et al. | 364/900 |
| 4,523,087 | 6/1985 | Benton | 235/379 |
| 4,829,596 | 5/1989 | Barina | 455/612 |

Primary Examiner—Akm Ullah
Attorney, Agent, or Firm—J. Michael Anglin

[57] ABSTRACT

An optical fiber link card communication module, and process for fabricating the module, where the module provides a parallel electrical interface to the user, facilitates high speed serial transmission of data over an optical data link, and contains a plurality of converters for performing conversions between both electrical and optical signals. A preferred embodiment of the invention contemplates fabricating the optical communication module on a single multilayer card with all the transmitter electrical components being located on one side of the card, all receiver electrical components being located on the other side of the card, and the transmitter and receiver components being separated by shielding layers in the card. By using two transmitter/receiver pairs (with the transmitters and receivers being located on respective sides of the card) an embodiment of the invention provides for double full duplex communications.

17 Claims, 4 Drawing Sheets

OPTICAL FIBER LINK CARD

This is a divisional of co-pending application Ser. No. 07/462,281, filed on Jan. 9, 1990 now U.S. Pat. No. 5,039,194.

BACKGROUND OF THE INVENTION

1. Field of the Invention

The invention relates generally to methods and apparatus for converting electrical signals to and from optical signals. More particularly, the invention relates to an optical fiber link card which serves as part of a communication module (not necessarily an enclosed or encapsulated device) for converting between parallel electrical signals and serial optical signals, and to a process for fabricating the module.

2. Description of the Related Art

Many types of electro-optical converters and connectors are described in issued patents and the technical literature. Commercially available devices are also presently available for performing these functions.

Examples of patents which describe electro-optical converters and connectors include U.S. Pat. No. 4,545,077, to Drapala et al, which teaches an electrical multiplex data bus operatively connected to an optical multiplex data bus by means of an electro-optical converter; and U.S. Pat. No. 4,597,631, to Flores et al, which teaches a passive electro-optical connector.

The Drapala et al invention is an example of a serial electrical to serial optical converter. Drapala et al operates as a tri-state repeater to effectively extend a three state data bus. The Flores invention is one of many connector devices that, although not dealing with electro-optical conversion per se, provides user access to transmitter/receiver assemblies via connectorized ports. The Flores device is an example of means for interconnecting both optical and electrical components in a hybrid system.

Commercially available connectorized electro-optical converters for performing serial optical to serial electrical (and vice versa) conversion, are available from Siemens and other companies. These devices, which are compatible with FDDI standards, IBM equipment, etc., are capable of achieving approximately 200 Mbits/sec. data rates.

Another example of a commercially available serial to serial converter is the AT&T ODL-200. This device is also capable of achieving approximately 200 Mbits/sec. data rates. The AT&T ODL-200 is described in an article entitled "Transmitter and Receiver Integrated Circuits for a 200 Mbits/sec. Optical Data Link", published in the proceedings of the IEEE 1986 Custom Integrated Circuits Conference.

The aforementioned commercially available devices utilize a single optical transmitter coupled through a fiber to a single receiver. Both the Siemens and AT&T devices allow full duplex communication with serial input/output. The receivers and transmitters used are hybrid ceramic substrates in dual inline packages. These packages are either hermetically sealed or plastic encapsulated.

Transceiver packages are also commercially available. For example, Mitsubishi Electric has made available transceiver packages having line bit rates of approximately 170 Mbits/sec., using a laser diode driver and optical receiver which are integrated onto a single side of a card. Similar to the aforementioned Siemens and AT&T transmitter/receiver modules, the Mitsubishi transceivers process input and output serially.

By placing the laser transmitter and receiver on the same side of a card, the Mitsubishi device requires means for electrically isolating these components. Typically metal shielding is used. Providing this isolation has heretofore limited the ability to manufacture a compact card onto which a plurality of transmitter and receiver pairs could be mounted.

The demand for improved electro-optical converters and connectors is rapidly increasing as fiber optic technologies are adapted to provide solutions to performance and packaging problems associated with present day computer interconnect applications. More particularly, I/O pin limitations caused by use of wide parallel data busses, performance limitations on the length of electrical busses, and electromagnetic interference problems, suggest that serial optical communications be used to convey data at high speed between the parallel electrical busses to which computer components are often interconnected. The high data rates required to service wide parallel data busses, the packaging flexibility of connectorized optical transmitter/receiver assemblies, and the necessity for user access to these connectorized ports, has led to the design of small feature cards to interconnect computer elements.

One such card is included in the commercially available PCO-2001 Series Parallel Lightwave Interface Module. This module performs parallel electrical signal to serial optical conversion (and vice versa) and features serial signal rates of up to approximately 100 Mbits/sec. A longwave LED is used for an optical source. Specialized transmitter and receiver ICs are incorporated onto one side of a card and provide full duplex operation.

The PCO-2001 card allows next level applications packages to interface with a high speed serial fiber optic link without adding to the design complexity of the next level packaging or performance requirements. However, the PCO-2001 card is problematic because of the electrical signal power needed for a LED source to drive data in the 200 Mbits/sec. range (twice that of the published data rate for the PCO-2001 device); the size of the PCO-2001 card (attributable in part to providing the isolation required for the transmitter and receiver components mounted on the same side of the card); and the inability to use a single, compact card to provide at least double full duplex operation.

Accordingly, it would be desirable if an optical fiber link card could be provided that supports a parallel user interface, such as a parallel data bus; performs parallel to serial conversion (and vice versa) for servicing a high speed serial optical link, where the optical transmitter on the card is capable of driving data in excess of 200 Mbits/sec. without requiring the electrical signal power needed for an LED source; and can support at least double full duplex connections in less space then is presently required to support single full duplex connections.

Furthermore, it would be desirable if the arrangement of the transmitter and receiver devices on such a card, together with the card itself, provided means to isolate transmitter and receiver electrical components without requiring excessive shielding or the amount of device separation required by the prior art.

Still further, it would be desirable if advantage could be taken of both sides of an optical data link card to increase the surface onto which components could be mounted to reduce card size. Further yet, it would be desirable to mount the optical components (and leads to these components) on the card in such a way as to facilitate easy access by a user and minimize lead capacitance and inductance to thereby further improve card performance.

To achieve the desired communication module many architecture, electrical and packaging problems need to be solved. For example, laser transmitters would be capable of achieving the desired data rates without requiring the electrical signal power required by LEDs; however, laser based systems must meet stringent safety requirements.

From a safety point of view, it would be desirable if a laser based optical fiber link card could be developed that is "fail safe", i.e., is certifiably safe at other than a total system level (where the system usually includes both hardware and software). The ability to produce a self-contained transmitter/receiver function in a certifiable package, completely independent of user system interface hardware and software, would ease restrictions on system level usage of a laser based card.

Many countries require certification of the "product" with respect to laser light emissions. Prior art laser based optical link subassemblies have a dependency on the "box" they are in to maintain compliance. If all the laser safety circuitry were on board the optical fiber link card, then the card would become the "product" that needs to be certified; not all the different models of boxes that it is used in. This would simplify the safety certification process for the user. More particularly, it would be desirable if an optical fiber link card could be devised that maintains known worldwide standards for class 1 operation under a single component failure.

In addition to all of the above, it would be desirable if an optical fiber link card communication module containing the features described hereinbefore also (1) provides a byte sync signal to the user, since many optical link subassemblies deliver fragmented parallel data; (2) provides a fault line to the user to aid in determining which end of an optical link suffers a failure; (3) provides an electrical wrap capability for diagnostic purposes; (4) requires only a single +5 volt supply which would make the card compatible with single voltage logic families; (5) maintains good thermal isolation between the electronics and the laser; (6) provides a package adaptable to multiple next level packaging; (7) uses standard surface mount assembly techniques instead of the expensive ceramic hybrid hermetic packaged subassemblies (particularly for the optical drivers and receivers) used by the prior art to achieve high data rates; and (8) is compact, i.e., small in size and height compared to known systems.

SUMMARY OF THE INVENTION

It is an object of the invention to provide a high speed optical fiber link card communication module that is capable of transmitting (or receiving) approximately 200 Mbits/sec. data serially over fiber optic media and which provides a parallel electrical interface to the user.

It is a further object of the invention to contain the high frequency signals coming off of (or going onto) the serial link, and serializer/deserializer functions, to the link card itself.

It is still a further object of the invention to provide an optical fiber link card communications module that can provide at least a double full duplex, where the card is compact and maintains a small form factor (for high density packaging) as compared with prior art devices, while maintaining a low height profile to the next level package to which it attaches.

Further still, it is an object of the invention to provide an optical fiber link card communication module that utilizes laser transmitters and provides self contained laser safety features so as to be certifiably safe, independent of user interface hardware or software. In particular, it is an object of the invention to provide safe, class 1, laser operating conditions under single fault conditions, and to provide means which facilitate the detection of laser failures and provide an indication of such failures to the user to aid in fault diagnosis.

Other objects of the invention include providing a module that outputs a byte synchronization signal to the user and non-fragmented parallel data; and providing a module that maintains good thermal isolation between the electronics and optical devices (in particular lasers) utilized.

According to the invention, a double sided surface mount optical fiber link card is used as part of a communication module that provides a parallel electrical interface to the user and transmits/receives high speed serial data over an optical data link. The card includes means for interfacing with at least one n-bit wide parallel electrical data bus; means for interfacing with at least one high speed optical data link; and a plurality of converters for performing conversion between both electrical and optical signals. At least one of these converters includes serializer means for serializing parallel data input for transmission, and modulating the serialized transmit data onto a semiconductor laser mounted on the card. At least one other converter includes an optical receiver (e.g., a PIN photodiode), amplifier and deserializer means, for respectively receiving, amplifying and recovering the clock to drive n-bit wide receive data onto a parallel bus.

According to one embodiment of the invention the optical components are edge mounted and have their leads mounted on the surface of the card (as opposed to standard pin-in-hole type leads) to minimize lead capacitance and inductance. Additionally, control means for the converters, and safety shut down means, are located on the same card as the electrical and optical components.

A preferred embodiment of the invention contemplates including in the optical communication module a single multilayer card with all the transmitter electrical components being located on one side of the card, all receiver electrical components being located on the other side of the card, with the transmitter and receiver components being electrically isolated from each other and separated by shielding layers in the card. By using at least two transmitter/receiver pairs (with the transmitters and receivers being located on respective sides of the card) the invention can provide for at least double full duplex communications.

A process for fabricating the desired module is also described hereinafter. The process specifies the steps for fabricating the card itself, together with where and how to mount and assemble the various components of the module (the card, retainer means, optical receptacles, etc.) to achieve the objectives of the invention.

The invention features the aforementioned double sided card design (i.e., with transmitter(s) on one side and the receiver(s) on the other side of the card), and features the use of internal ground and power planes (located within the card itself) to maintain electrical isolation between the two sides of the card. The invention also features integration of the serializer with the laser driver to contribute to reducing the size of the card.

Further features of the invention, according to a preferred embodiment, include an electrical wrap capability for diagnostic purposes, the requirement of only a single +5 volt power supply, and surface edge mounting of the optical components and their leads.

These and other objects and features of the present invention, and the manner of obtaining them, will become apparent to those skilled in the art, and the invention itself will be best understood by reference to the following detailed description read in conjunction with the accompanying Drawing.

DETAILED DESCRIPTION

Figure 1:
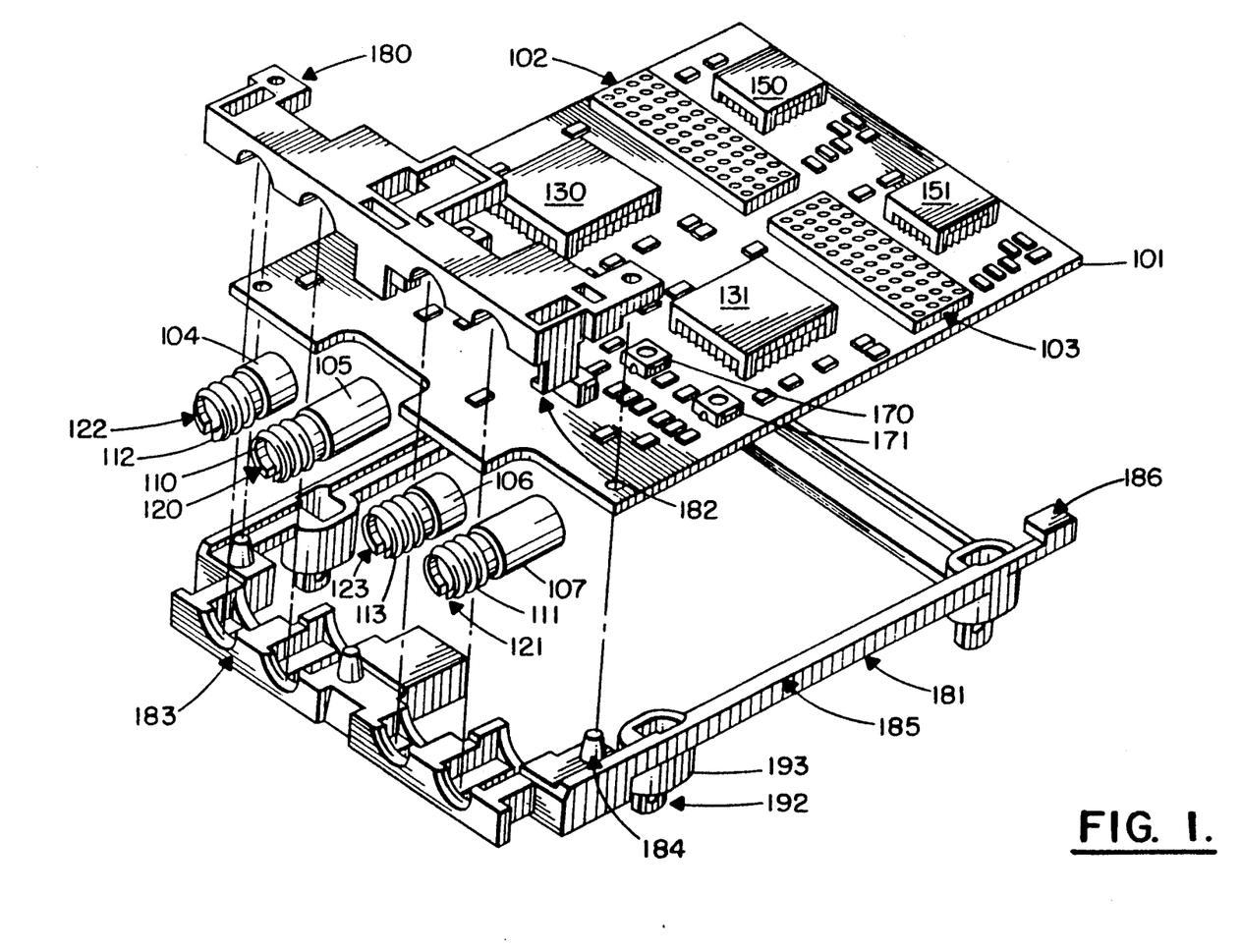
FIG. 1 depicts an exploded view of the optical link card communication module (both card and retainer) contemplated by the invention.

FIG. 1 depicts an exploded view of the optical link card communication module contemplated by the invention.

In particular, FIG. 1 depicts a double sided surface mount card, 101, that mounts to a user's system card. Data is transferred to and from the system card on n-bit wide parallel data busses.

For the sake of illustration only, the card depicted in FIG. 1 is designed to service 10 bit wide parallel data busses, i e , n is set equal to 10. Those skilled in the art will readily appreciate that the components depicted in FIG. 1 could be modified to accommodate larger or smaller parallel busses.

The depicted card includes means for interfacing with the parallel data busses (connectors 102 and 103); means for interfacing with serial fiber optic transmission media (optical assemblies 104–107, further including receptacles 110 and 111 for lasers 120 and 121 respectively located within the receptacles; and receptacles 112 and 113 for photodetector diodes 122 and 123 respectively located within the receptacles); and a plurality of converters for performing conversion between both electrical and optical signals.

For the sake of illustration only, receptacles 110-113 are shown in FIG. 1 as an FC type optical fiber connector. Those skilled in the art will readily appreciate that the components depicted in FIG. 1 could include other types of fiber connectors.

These converters are described in detail hereinafter with reference to FIG. 4. However, with reference to FIG. 1, portions of two converters of a first type (for converting from electrical to optical signals) can be seen mounted on top of circuit card 101. In particular, serializer means 130 and 131, are modules which take parallel electrical data input (via connectors 102 and 103 respectively) for transmission, and convert the parallel electrical data to serial electrical data. Serializer means 130 and 131 then use the serialized data to drive lasers 120 and 121 respectively. According to one embodiment of the invention, serializer means 130 and 131 also each perform laser safety functions which will be described in detail hereinafter.

According to the preferred embodiment of the invention, the serializer and laser drive functions are integrated in serializer means 130 and 131 in order to help reduce the overall size of the novel card. The integrated functions of the serializer means will also be described in greater detail hereinafter with reference to FIG. 4.

Not shown in FIG. 1 (because they are mounted to the underside of card 101) are converters of a second type. These function to convert optical signals to electrical signals. The depicted illustrative card would have two such converters, each of which include means for amplifying the electrical signal generated by the photodetectors; means for detecting minimum DC light levels entering each of the photodetectors; and deserializer means for converting received serial data to parallel data. The deserializer further includes means for recovering the clock, means for generating a byte synchronization signal for output to the user, and means for detecting minimum AC light levels.

A detailed description of the deserializer components and how they cooperate will be set forth hereinafter with reference to FIG. 4 as well.

FIG. 1 goes on to show two open fiber control (OFC) means, 150 and 151. OFC means 150 turns off laser 120 if no light is received by the photodetector diode 122. OFC means 151 turns off laser 121 if no light is received by photodetector diode 123.

According to the preferred embodiment of the invention, OFC means 150 and 151 maintain a safe (class 1) optical power level in the event a fiber link is opened.

FIG. 1 also depicts laser drive adjustment potentiometers 170 and 171. These potentiometers may be used to adjust the AC and DC laser drive circuitry. The depicted potentiometers (170 and 171) are associated with laser 121 of FIG. 1. Not shown are corresponding potentiometers for each of the AC and DC drive portions of the laser drive circuitry associated with laser 120.

Also not shown (located on the underside of card 101) are metal shields for each of the aforementioned amplifiers. According to a preferred embodiment of the invention these shields serve to protect the amplifiers against stray electromagnetic fields.

In addition to the above described card, optical assemblies and electronics, FIG. 1 depicts retainer top 180 and retainer bottom 181, which include retainer retention clips (like clip 182), optical assembly slots (like slot 183), card alignment pins (like pin 184), card guide rail 185 and card hold down tabs (like tab 186). which when assembled in the manner indicated by FIG. 1 result in an embodiment of the optical fiber link card communication module contemplated by the invention.

According to the preferred embodiment of the invention, retainer top 180 and retainer bottom 181 are plastic and contribute to the ability of the novel module to provide good thermal isolation between the electronics and the lasers. This is an important feature of the invention since the electronics typically have a higher acceptable operating temperature then the lasers, which dissipate little power. In prior art hybrid type metal enclosed transmitters, the heat from the electronics can degrade the reliability and operation of the transmitters.

Furthermore, according to the preferred embodiment of the invention, the two piece retainer/holder described hereinabove (parts 180 and 181 as shown in FIG. 1) when assembled form a cradle to align and hold the optical assemblies at the edge of the card in an appropriate plane to permit surface attachment of the leads to the mating circuitry. As indicated hereinbefore, taking advantage of this feature minimizes lead capacitance and inductance.

Figure 2:
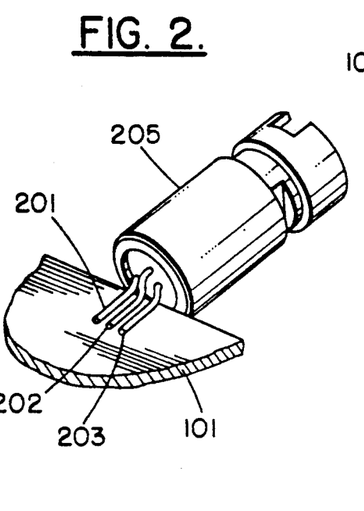
FIG. 2 depicts an enlarged view of an edge mounted optical assembly with leads brought in close to the plane of the circuit card in accordance with a preferred embodiment of the invention.

FIG. 2 depicts an enlarged view of an edge mounted optical assembly with leads brought in close to the plane of the circuit card, as contemplated by the aforementioned preferred embodiment of the invention. In particular, FIG. 2 depicts leads 201-203 as being surface mounted (rather then using a pin-in-hole attachment) to card 101. Optical assembly 205 is shown mounted on the edge of card 101.

Referring again to FIG. 1, it can be seen that a "J" clip, clip 192, is depicted as a molded part of retainer bottom 181, extending from standoff spacer 193. The combination of clip 192 and spacer 193 may be used to attach, hold, align and space card/retainer assemblies to next level assemblies.

Figure 3:
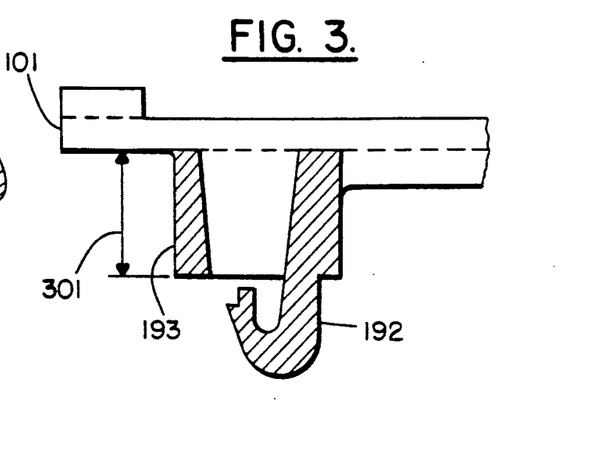
FIG. 3 depicts an enlarged view of a suitable standoff spacer for controlling card-to-card spacing for the modules fabricated in accordance with the teachings of the invention, together with a "J" clip extending from the spacer which operates as a flexible retention mechanism for affixing the novel modules to next level assemblies.

FIG. 3 depicts an enlarged view of a preferred arrangement for standoff spacer 193 (with the spacing from the surface of card 101 to the next assembly being indicated by arrow 301), and "J" clip 192. Clip 192 is shown extending off of spacer 193. Operatively, clip 192 snaps into a mating hole in the main controller or interface card to which it plugs. As a molded plastic part, this clip has the flexibility to allow the nondestructive removal of the novel communication module when and if replacement is needed or desired.

Figure 4:
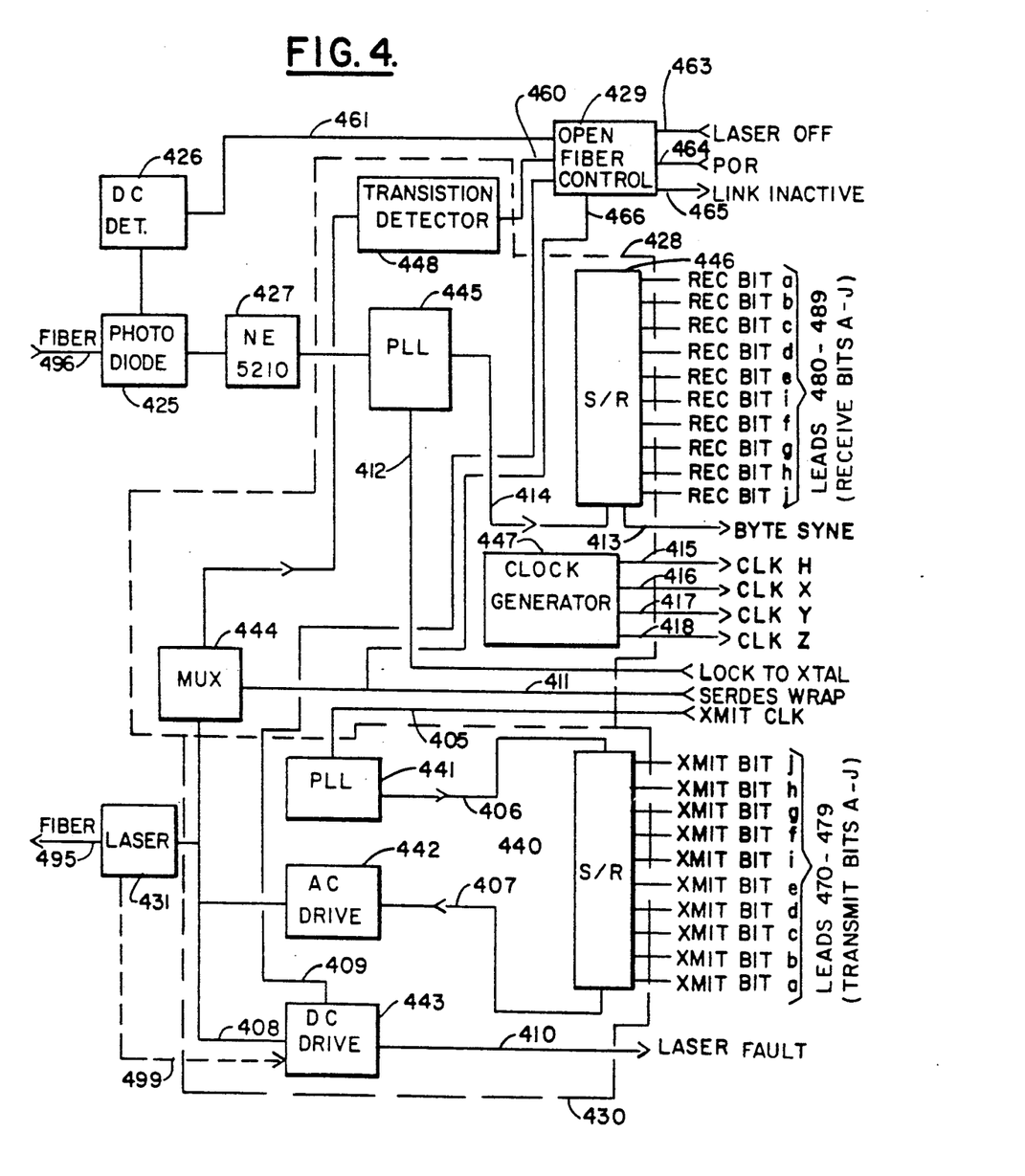
FIG. 4 is a functional block diagram of the invention, depicting the interconnection of various electrical and optical components on the card and how these components cooperate with one another.

Reference is now made to FIG. 4 which depicts a functional block diagram of the electrical and optical components on card 101.

In particular, FIG. 4 shows the combination of serializer means 430 and laser diode 431 which effectively converts parallel electrical signals to serial optical signals. The parallel signals are input from a parallel bus via, for example, an electrical connector such as connector 102 depicted in FIG. 1. The serial optical signals are output from laser 431 for transmission over fiber optic media, such as fiber 495 depicted in FIG. 4. Well known coupling lenses may be used within the laser receptacles depicted in FIG. 1 (such as receptacles 110 and 111) to direct the laser light into the fiber.

The details of how serializer 430 operates in conjunction with laser 431 will be set forth hereinafter with reference to the components (depicted in FIG. 4) shown to be included within serializer means 430. These details will be set forth in the context of an example wherein 10 bits of parallel electrical data are input to serializer 430, are converted to serial electrical format and output as serial optical data via laser 431 under the control of serializer 430.

FIG. 4 also depicts the combination of photodetector diode 425, DC detector 426, amplifier 427 and deserializer means 428, which effectively convert serial optical signals, received by photodetector 425, to parallel electrical signals. The parallel signals are driven by deserializer 428 onto a parallel electrical bus. An explanation of how serially received optical data signals are converted to parallel electrical data will also be set forth hereinafter with reference to the components depicted in FIG. 4.

Furthermore, FIG. 4 depicts OFC module 429, which, as indicated hereinbefore, preferably provides class 1 laser safety features on board the card itself. Reference is again made to the incorporated copending patent application which sets forth in detail how OFC module 429 operates in the context of the system depicted in FIG. 4.

To understand how the combination of serializer 430 and laser 431 operates, it is convenient to start at the point in FIG. 4 where the 10 bit parallel transmit data is input from a parallel electrical data bus to shift register 440. This takes place via depicted leads 470-479. As indicated hereinbefore these leads could, for example, correspond to user selected pins on an electrical connector, such as connector 102 depicted in FIG. 1.

The ten bit parallel transmit data entering shift register 440 is serially clocked out of shift register 440 under control of phase locked loop (PLL) 441. The PLL clock is phase locked to the lower frequency (off card) input transmit clock via link 405. The clock output on link 406 determines the serial transmit rate.

The serial data shifted out of shift register 440 is carried to AC drive 442 via link 407. AC drive 442 modulates laser 431 with the serialized data.

FIG. 4 also shows a DC drive, 443, contained in serializer 430. DC drive 443 keeps laser 431 at a preset power level. Additionally, DC drive 443, according to a preferred embodiment of the invention, contains safety circuits that can shut down laser 431 if an on card fault occurs that could produce an unsafe power level.

FIG. 4 depicts DC drive 443 as being coupled to laser 431 via link 408. Additionally, DC drive 443 is shown receiving an input from open fiber control (OFC) means 429 which, as will be explained hereinafter, can effectively force DC drive 443 (via link 409) to shut laser 431 off.

According to a preferred embodiment of the invention, DC drive 443 will issue a laser fault signal to the user via link 410, whenever a laser fault (e.g., an OFC ordered shut down) occurs.

Finally, with respect to DC drive 443, FIG. 4 shows (via dotted link 499) a feedback path from laser 431 to DC drive 443. A conventional automatic power control feedback circuit (not shown) senses light from the back facet of laser 431. According to the illustrative embodiment of the invention, optical output power is maintained at a constant level via DC drive 443 in response to the feedback signal. As indicated hereinbefore one of the adjustment potentiometers depicted in FIG. 1 indirectly controls DC drive 443. It is via the aforementioned feedback circuit that this control is effected.

Apparatus and techniques for performing the functions of the components shown included in serializer 430, namely shift register 440, PLL 441, AC drive 442 and DC drive 443, are well within the purview of those skilled in the art. Accordingly, these components do not require further explanation.

The above described serializer 430, comprising the combination of devices 440-443, effectively integrates the desired serializer and laser drive functions, in the manner, described, to help reduce overall card size. Furthermore, it can be seen with reference to the above description that serializer 430 functions as one of the plurality of electro-optical converters located on board the card. Control means for performing the conversion (e.g., PLL 441) are located on board the card as well.

The optical link card contemplated by the invention also includes on board circuitry for testing the card itself. In particular, FIG. 4 depicts multiplexer (MUX) 444 (for convenience shown as part of deserializer 428) which can be used to provide serialized data from serializer 430, to other deserializer 428 components, in a wrap mode. According to one embodiment of the invention, wrap mode can be user specified via link 411 which is shown coupled to MUX 444. A signal to enter wrap mode causes the multiplexed data to be processed by deserializer 428.

The top portion of FIG. 4 depicts fiber 496 providing serial optical signals to photodetector diode 425. Fiber 496 may be "butt coupled" (held juxtaposed) to the active area of photodetector diode 425 to allow the transmitted light to be converted to electrical energy.

According to a preferred embodiment of the invention, the resultant current (from photodetector diode 425) is amplified by a transimpedance amplifier, 427, such as the NE-5210 amplifier depicted in FIG. 4.

PLL 445, shown included in deserializer 428, phase locks a serial receive clock to the data amplified by amplifier 427, and sends both the data and the clock to shift register 446 where the data is deserialized.

In a preferred embodiment of the invention, as depicted in FIG. 4, PLL 445 is shown locked to an on card crystal via link 412. The PLL is locked to the crystal to approximate the expected input data rate. The PLL then "fine tunes" the lock and locks onto the receive data at the actual receive data rate.

Shift register 446 includes a byte synchronization detector that is used to recognize a unique receive character so that complete bytes can be unloaded from shift register 446 without being fragmented. Shift register 446 also includes TTL drivers (which actually output the parallel data to a parallel data bus via leads 480–489) and means for outputting a byte synchronization signal to the user via link 413

FIG. 4 also depicts clock generator 447 which, according to a preferred embodiment of the invention, is a four phase parallel receive clock. The four phase clock is useful for deriving non-overlap clocks which are typically used (or may be required) by the external system.

Clock generator 447 is shown tied to PLL 445 via link 414. Additionally, the four phase clock output from clock generator 447 is shown output on links 415–418 of FIG. 4.

Finally, deserializer 428 is shown to include transition detector 448. Transition detector 448, together with DC detector 426 (not included in the deserializer in the illustrative embodiment of the invention) detect minimum AC and DC light levels entering photodetector diode 425. These redundant signals are carried to OFC module 429 via links 460 and 461 and are used by OFC module 429 as a safety interlock to shut down the link if both fiber paths 495 and 496 are not hooked up.

The OFC module described in the referenced patent application, pulses laser 431 at a low duty cycle during the time the fiber link is open. This produces a safe optical power in the fiber. The referenced OFC module will return laser 431 to continuous power when the fiber link is reconnected.

OFC module 429 of FIG. 4 is shown to control laser 431 via link 409 to DC drive 443. Additionally, the preferred OFC module is shown to accept user inputs for turning the laser off and performing a power on reset function, via links 463 and 464 respectively. Link 465 is shown to provide a signal to the user when the fiber link is inactive. Finally, link 466 is shown to provide an indication to OFC module 429 whenever the user specifies wrap mode via link 411.

Apparatus and techniques for performing the functions of the components shown included in deserializer 428, namely PLL 445, shift register 446, clock generator 447, and transition detector 448, are well within the purview of those skilled in the art. The same holds true for laser 431, photodiode 425, amplifier 427, DC detector 426, and MUX 444, which are all commercially available devices. Accordingly, these components do not require further explanation.

What has been described with reference to FIG. 4 are the components, and how they interact, to form single full duplex operation. Card 101 of FIG. 1, constructed in accordance with a preferred embodiment of the invention, duplicates the components depicted in FIG. 4 to provide double full duplex operation.

According to the preferred embodiment of the invention, serializer 430, deserializer 428 and the TTL drivers in shift register 446 (even though part of deserialized 428), together with the duplicate set of these devices contemplated in FIG. 1, are connected to power (+5 volts) and ground planes within card 101. These planes and how the both sides (top and bottom) of card 101 are used in accordance with the teachings of the invention, are described hereinafter with reference to FIG. 5.

Figure 5A:
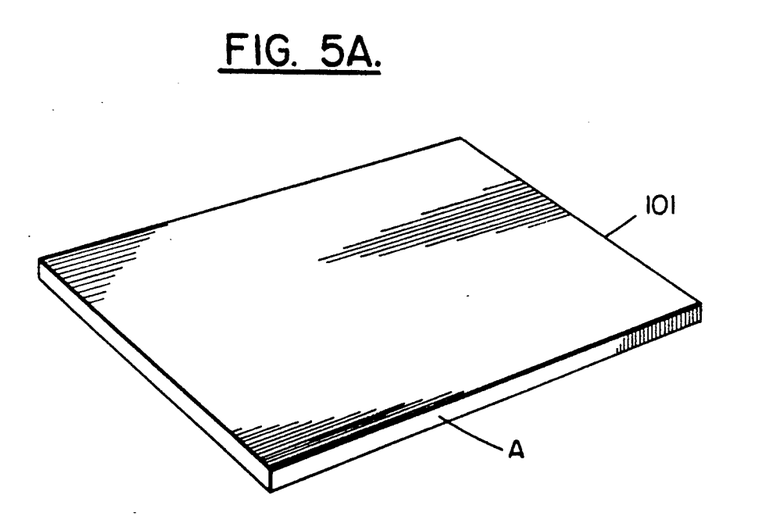
FIGS. 5A & B depicts an example of a power and ground plane structure for a double sided card that is fabricated in accordance with the teachings of the invention.
Figure 5B:
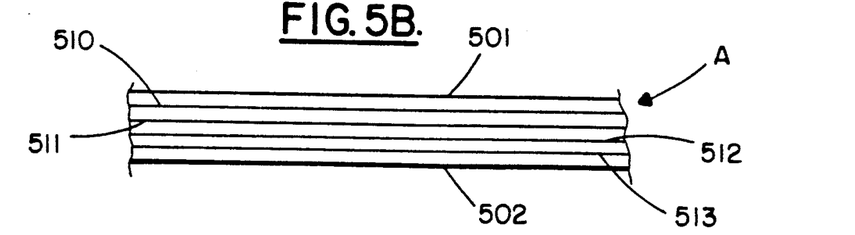

FIG. 5 illustrates that wiring land patterns 501 and 502 are respectively located on opposite surfaces (top and bottom) of card 101. These patterns are used to electrically interconnect the components mounted on each side of the card.

A side view of card 101, looking through the card into the surface labeled "A", shows that a card fabricated in accordance with the teachings of the invention contains a plurality of internal power and ground planes. By way of example these internal planes are depicted as planes 510–513 in FIG. 5. Planes 510 and 511 represent a ground and power plane, respectively, and service one side of the card (e.g., the components mounted on surface 501). Planes 512 and 513 represent another power and ground plane respectively, and service the other side of the card (e.g., the components mounted on surface 502).

Any combination of planes is possible. What is required according to the invention is that a plurality of internal power and ground planes be provided which inherently provide electrical isolation between the components mounted to the top and bottom surfaces of the card. Also, the components that perform the transmit function, and the components that perform the receive function, are to be located on opposite sides of the card.

According to the preferred embodiment of the invention, the internal power and ground planes that service the side of the card containing at least one deserializer, are partitioned so that the TTL drivers included in shift register 446 (and any other shift register on this side of the card) are electrically isolated from the portion of the power and ground planes serving the remainder of a given deserializer. This is desirable because of the amount of current required for the TTL drivers.

Additionally, according to the preferred embodiment of the invention, the power and ground planes servicing the transmit function are fabricated so as not to cover (i.e., are fabricated to have an opening over) the aforementioned partitioned portion of the power and ground planes serving the TTL drivers. The purpose of fabricating the transmit function power and ground planes in this fashion is to keep noise from the TTL power and ground planes from coupling to the transmit power and ground planes.

Figure 6A:
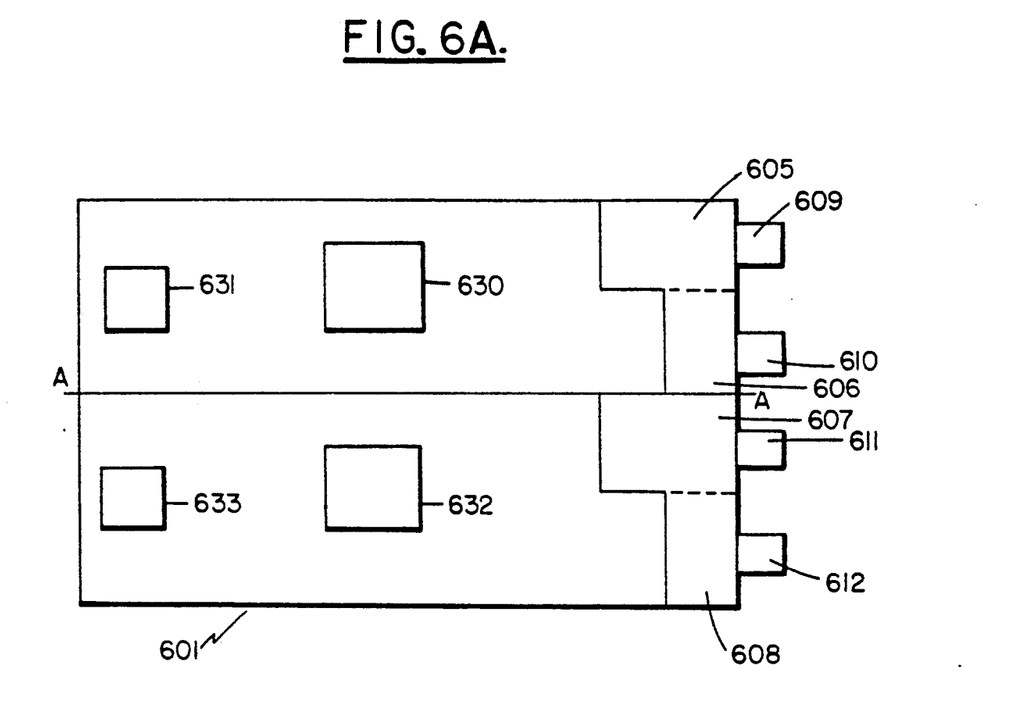
FIGS. 6A & B depicts a preferred layout for the optical link card contemplated by the invention.
Figure 6B:
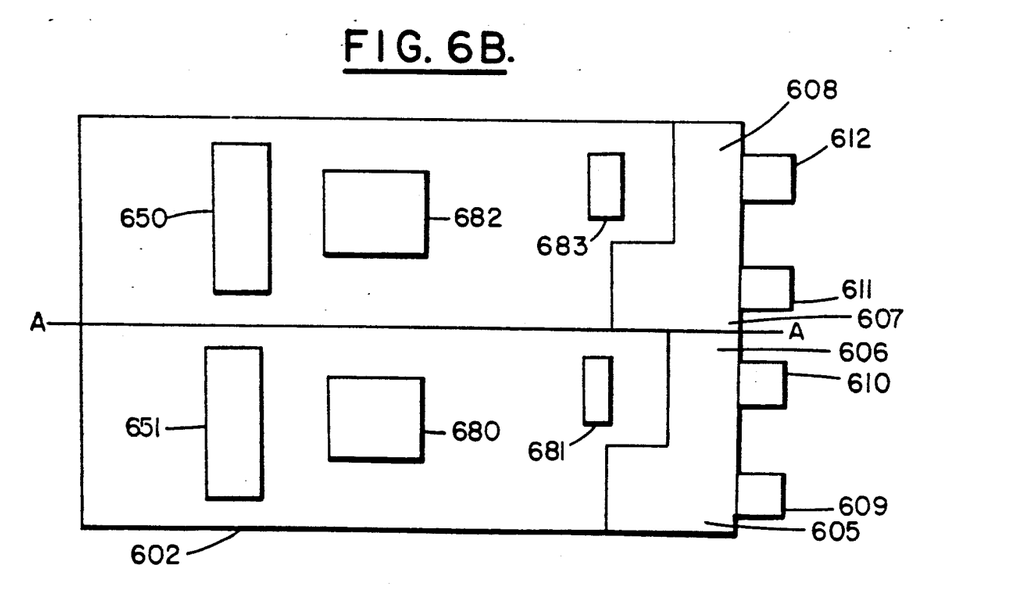

Reference is now made to FIG. 6 which depicts a preferred layout for the optical link card contemplated by the invention. The layout shown provides double full duplex channels. The preferred card could be enlarged to provide further communication ports, or be cut in half (along line A—A of FIG. 6) to provide a single full duplex card.

The double full duplex channels depicted in FIG. 6 includes two identical but electrically isolated transmit/receive pairs comprised of laser 605 and photodetector diode 606 (one pair) and laser 607 and photodetector diode 608 (the other pair), mounted on a double sided surface mount card. There are no electrical connections, surface or internal, across the boundary formed by line A—A in FIG. 6.

As indicated hereinabove with reference to FIG. 5, the card has top and bottom signal planes and four internal power planes (not shown in FIG. 6) which may be used advantageously to isolate the transmitters from the receivers. For the sake of illustration, the top of the card depicted in FIG. 6 is labeled 601, while the bottom of the card is labeled 602.

To accommodate the 10 bit parallel buses serviced by the illustrative embodiment of the invention, two 48 pin connectors (connectors 102 and 103 in FIG. 1) with 100 mil pin centers are mounted on the top side of the card such that the pins protrude through the raw card to the bottom side where they would mate to the user's system card. This allows for minimal card to card spacing and a total card height that meets low profile requirements. The pin side of the connectors are illustrated in the layout depicted in FIG. 6 as connectors 650 and 651.

Four optical connectors, 609-612, are shown mounted juxtaposed to the lasers and photodetectors at the edge of the card. Connectors 609-612 easily protrude out into customer available access areas when the card is typically mounted onto a system card.

FIG. 6 also depicts the position of deserializer 680 and amplifier 681 (associated with photodetector diode 606) and deserializer 682 and amplifier 683 (associated with photodetector diode 608) as they are preferably mounted on the bottom surface, 602, of the card.

Serializer 630 and open fiber control module 631 (associated with laser 605), together with serializer 632 and open fiber control module 633 (associated with laser 607) are shown in the positions in which they are preferably mounted to the top side, 601, of the card.

The dimensions shown on FIG. 6 are for the purpose of illustration only, but indicate a suitable card size and suitable optical spacing to yield the desired, compact, double duplex communication module. The method for mounting the connector pins referred to hereinabove allows for 7 mm card to card spacing and a total card height of approximately 12 mm using the card depicted in FIG. 6.

What has been described are methods, apparatus and manufacturing techniques which meets all of the objectives set forth hereinbefore. Those skilled in the art will recognize that the foregoing description has been presented for the purposes of illustration and description only. It is not intended to be exhaustive or to limit the invention to the precise form disclosed, and obviously many modifications and variations are possible in light of the above teaching.

For example, components shown to be included in the deserializer, like MUX 444, could be located elsewhere, versions of the desired card could be produced without an electrical wrap capability or the on board safety features incorporated in preferred embodiments of the invention, etc.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. An optical communication module, including a single multilayer double surface mount optical fiber link card having a plurality of converters mounted thereon, for converting between parallel electrical signals and serial optical signals, wherein said optical signals are transmitted and received by the module over at least one full duplex optical communication link, comprising:
    (a) first optical assembly means, electrically coupled to at least one of said plurality of converters, including at least one axial leaded optical transmitter that is optically coupled to said communication link; and
    (b) retainer means, for holding said first optical assembly in proximity to an edge of said card so as to align said at least one optical transmitter to said edge and facilitate attaching the leads of said at least one optical transmitter to the surface of said card.

2. Apparatus as set forth in claim 1 wherein said module further comprises, second optical assembly means, including at least one axial leaded optical receiver for detecting serial optical signals input from said at least one full duplex optical communication link and for generating serial electrical signals in response thereto, wherein said retainer means is also operative to hold said second assembly in proximity to an edge of said card so as to align said at least one optical receiver to said edge and facilitate attaching the leads of said at least one optical receiver to the surface of said card.

3. Apparatus as set forth in claim 2 wherein said retainer means is comprised of a two piece, snap together, retainer/holder which when assembled provides a slotted cradle for holding said first and second optical assembly means.

4. Apparatus as set forth in claim 3 wherein said retainer means is molded from plastic and further comprises insert pins and rails to mechanically hold said first and second optical assemblies to said card.

5. Apparatus as set forth in claim 4 wherein said retainer means further comprises flexible "J" clip and stand off means.

6. Apparatus as set forth in claim 4 wherein said retainer means thermally isolates said converter means from said optical transmitter 7. A process for manufacturing an optical fiber link card, for converting between parallel electrical signals and serial optical signals, wherein said card includes at least one optical transmitter, at least one optical receiver, a set of transmitter related electronic components and a set of receiver related electronic components, comprising the steps of:

(a) fabricating a first signal plane on the surface of a first side of said card;

(b) fabricating a second signal plane on the surface of a second and opposite side of said card;

(c) surface mounting all transmitter related electronic components to said first signal plane;

(d) surface mounting all receiver related electronic components to said second signal plane; and (e) fabricating a plurality of internal power and ground planes within said card, to service said transmitter related electronic components and said receiver related electronic components, whereby said plurality of power and ground planes inherently isolate said transmitter related electronic components from said receiver related electronic components.

8. A process as set forth in claim 7 wherein said step of fabricating a plurality of power and ground planes within said card further comprises the step of partitioning at least one of said plurality of power and ground planes to electrically isolate selected electronic components attached thereto.

9. A process as set forth in claim 8 wherein said step of fabricating a plurality of power and ground planes within said card further comprises the step of fabricating at least one other of said plurality of power and ground planes to include an aperture over the partitioned portion of said power and ground planes servicing said selected electronic components.

10. A process as set forth in claim 7 further comprising the step of fabricating safety shut down means on said card for shutting off said at least one optical transmitter whenever said communication link is open.

11. A process as set forth in claim 7, wherein said transmitter related electronic components include means for serializing parallel electrical signals and means for driving said at least one optical transmitter, further comprising the step of integrating said means for serializing with said means for driving to reduce the amount of card surface area required to mount said transmitter related electronic components.

12. A process for manufacturing an optical communication module, including a single multilayer double surface mount optical fiber link card having a plurality of converters mounted thereon, for converting between parallel electrical signals and serial optical signals, wherein said optical signals are transmitted and received by the module over at least one full duplex optical communication link, comprising the steps of:

(a) fabricating first optical assembly means, electrically coupled to at least one of said plurality of converters, including at least one axial leaded optical transmitter that is optically coupled to said communication link; and (b) fabricating retainer means, for holding said first optical assembly in proximity to an edge of said card so as to align said at least one optical transmitter to said edge and facilitate attaching the leads of said at least one optical transmitter to the surface of said card.

13. A process as set forth in claim 12 further comprising the step of fabricating second optical assembly means, including at least one axial leaded optical receiver for detecting serial optical signals input from said at least one full duplex optical communication link and for generating serial electrical signals in response thereto, wherein said retainer means fabricated in step (b) is also operative to hold said second assembly in proximity to an edge of said card so as to align said at least one optical receiver to said edge and facilitate attaching the leads of said at least one optical receiver to the surface of said card.

14. A process as set forth in claim 13 further comprising the step of attaching the leads of said at least one optical transmitter and the leads of said at least one optical receiver, to the surface of said card.

15. A process as set forth in claim 14 wherein said step of fabricating retainer means further comprises the step of snapping together a two piece retainer/holder assembly that, when snapped together, provides a slotted cradle for holding said first and second optical assembly means.

16. A process as set forth in claim 15 wherein said step of fabricating retainer means further comprises the step of molding said retainer/holder assembly from plastic.

17. A process as set forth in claim 16 wherein said step of molding said retainer/holder assembly yields insert pins and rails to mechanically hold said first and second optical assemblies to said card, flexible "J" clip and stand off means which facilitate creating multicard assemblies, and means for thermally isolating said plurality of converters from said at least one optical transmitter.

* * * * *